United States Patent Office 2,760,591
Patented Aug. 28, 1956

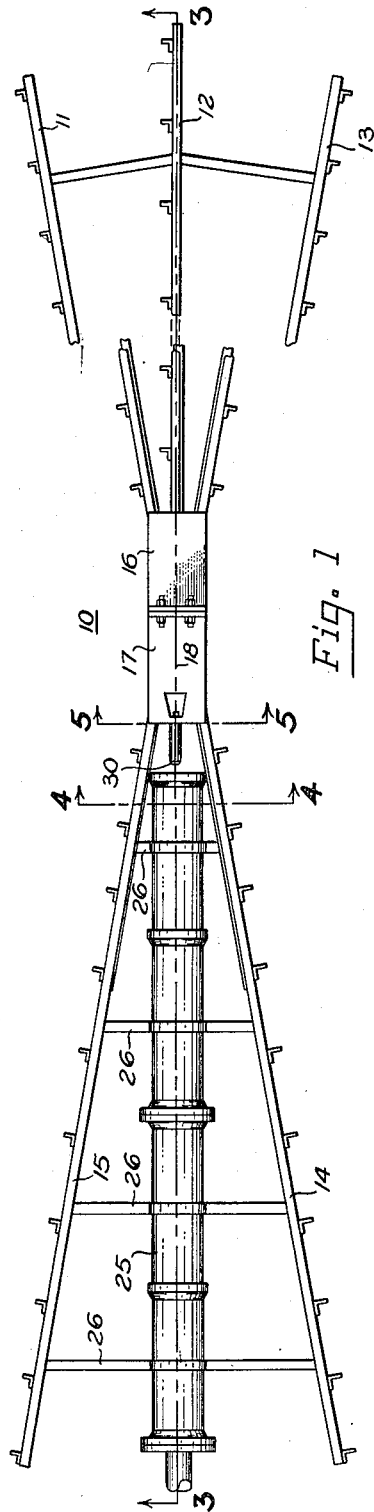
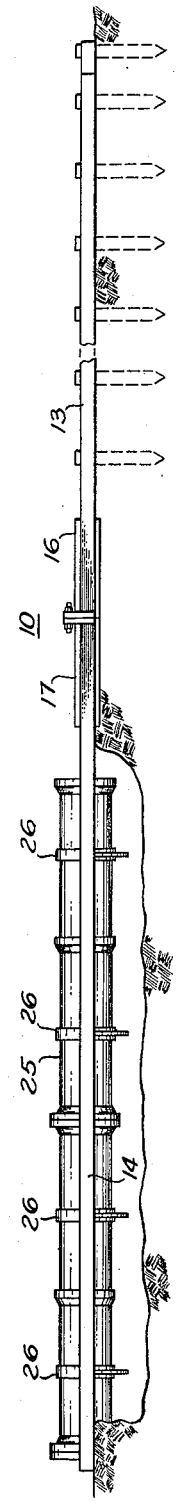
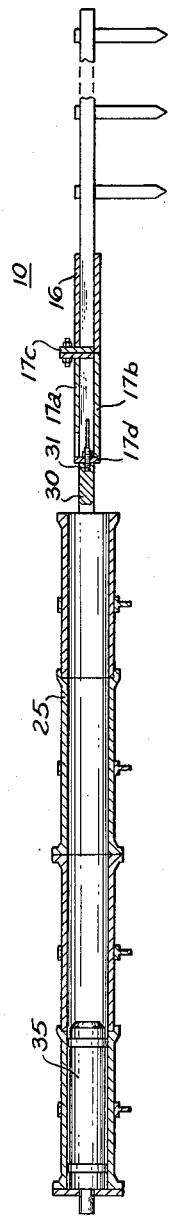
Fig. 1
Fig. 2
Fig. 3
JAMES E. WHITE
JOHN A. LEE
INVENTOR.
BY D. Carl Richards
AGENT

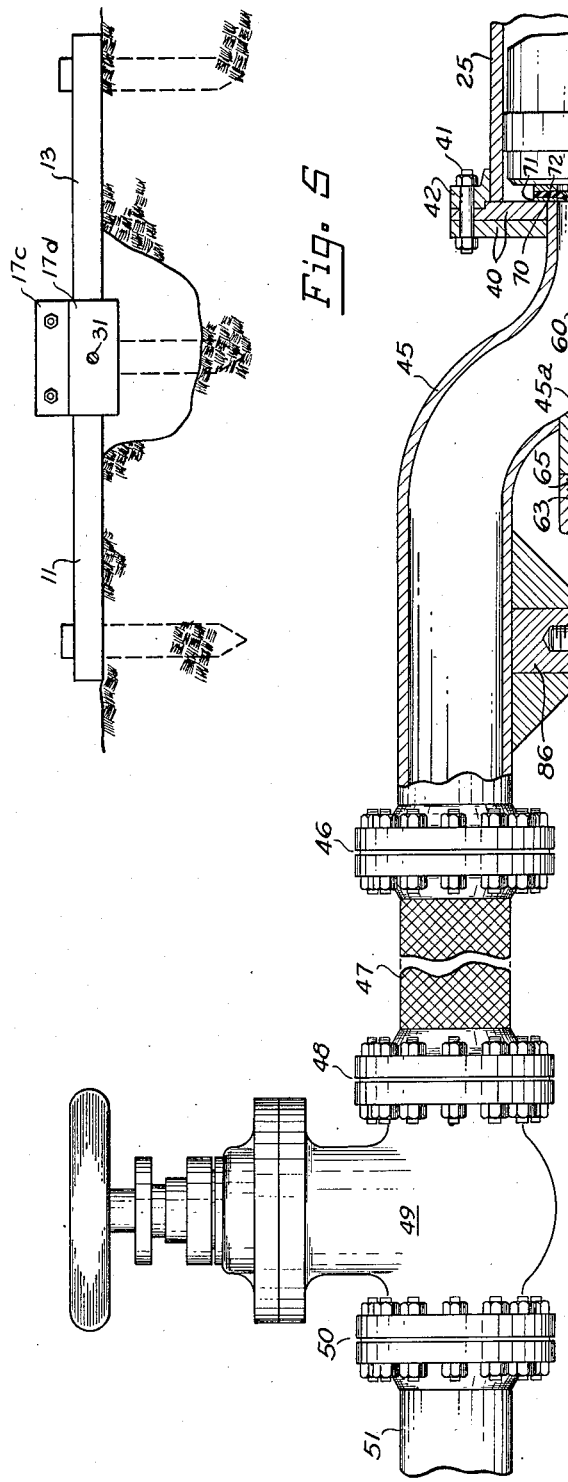

2,760,591

SYSTEM FOR GENERATING HORIZONTALLY POLARIZED SHEAR WAVES

James E. White and John A. Lee, Dallas, Tex., assignors, by mesne assignments, to Socony Mobil Oil Company, Inc., a corporation of New York Application May 8, 1952, Serial No. 286,759

5 Claims. (Cl. 181—.5)

This invention relates to seismic exploration and more particularly to the surface generation of horizontally polarized shear waves. In a more specific aspect, the present invention relates to imparting energy to and utilizing energy from a high velocity mass for shear wave generation.

Utilization of shear waves, that is waves in which particle motion is confined to a direction normal to the direction of propagation, has been hampered because of the difficulty of generating shear waves of sufficient energy to permit their detection after traveling from a surface generating station to a subsurface reflecting horizon and back to a surface detecting station. In the co-pending patent application of James E. White and Stanley N. Heaps for Shear Wave Seismic Exploration, S. N. 286,760, filed May 8, 1952, now Patent No. 2,740,489, a method and system for utilization of shear waves is disclosed. The present invention relates to means for generating shear waves of sufficient amplitude to extend greatly the depth range of exploration by means of shear waves.

In accordance with the present invention there is provided a shear wave generator for producing high energy shear waves which comprises an elongated barrel horizontally positioned on the earth's surface with closure means for a first end of the barrel and a cylindrical mass slidably mounted within the barrel adjacent the closure means. High pressure from a source of expansible gas abruptly applied to the area of the end of the mass adjacent the closure means produces high velocity travel of the mass along the length of the barrel. The travel of the mass is abruptly arrested by means anchored to the earth's surface adjacent the other end of the barrel to impart an impulse predominantly of shear wave character to the earth's surface.

A buffer preferably is placed in the path between the arresting means and the mass which is yieldable to bring the mass to a stop in an interval approximately equal to one-fourth the period of the predetermined frequency, at the same time maintaining the stresses in the arresting means within practical limits while transmitting high energy to the earth.

In a more specific aspect of the invention, applicant provides a system for generating shear waves of high intensity and predominantly of a preselected frequency which includes an elongated barrel or tube positioned parallel to and substantially at the earth's surface with a cylindrical mass slidably mounted in the barrel and anchored at one end thereof. Pressuring means having a volume substantially greater than the entire volume of the barrel is connected to the barrel by means forming an unimpeded flow path. Means are provided for releasing the anchored mass for travel under pressure along the length of the barrel to impinge a framework which includes a plurality of ground anchoring pins distributed throughout a substantial area of the earth's surface as to be rigid in the direction of travel of said mass. The framework includes a target immediately adjacent the muzzle end of the barrel with the yieldable member between the target and said muzzle end and supported from the target for stopping the mass in an interval equal to one-fourth the period of the preselected frequency.

In a further aspect of the invention the breech end of the barrel is provided with an opening of substantially reduced diameter with means for rigidly coupling the cylindrical mass in the breech end in a substantially air tight relation for limiting the initial application of pressure thereto to the area equal to said opening. The foregoing structure together with means for breaking the coupling to release the mass permits application upon initial movement of the pressure at the breech end of the barrel to the entire area of the end of the mass for production of high velocity travel through the barrel.

For further objects and advantages of the invention and for a more complete understanding thereof, reference may now be had to the following description taken in conjunction with the accompanying drawings in which:

Fig. 1 is a plan view of the earth anchoring member and the associated barrel;

Fig. 2 is an elevation view partially cut away of the system of Fig. 1;

Fig. 3 is a sectional view taken along the axial line 3—3 of Fig. 1;

Fig. 4 is a sectional view taken along the line 4—4 of Fig. 1;

Fig. 5 is a sectional view taken along the line 5—5 of Fig. 1;

Fig. 6 shows a mass anchoring and releasing system partially in section;

Fig. 7 is a sectional view of an alternative form of mass catcher; and

Fig. 8 illustrates an alternative form of source of high pressure expansible gas.

Referring now to Fig. 1, there is illustrated an earth anchoring member 10 comprising elongated arms 11, 12, 13, 14 and 15 which radiate or extend from central sections 16 and 17 at relatively small angles from the central or axial line 18. The arm 12 lies along or in coincidence with the axial line 18 and extends from the central member 16. Arms 11 and 13 diverge at angles of less than 10° therefrom and, together with arm 12, are rigidly coupled to member 16 as by welded sections or bolts. Arms 14 and 15, extending at angles similar to arms 11 and 13, are at the other end and extend to the left from the central member 17. At spaced points along each of arms 11—15 are a plurality of ground anchoring pins which are planted in the earth. Suitable plants may be made by driving the pins into the earth in a pattern conforming to that of the arms and bolting or welding them to the anchoring arms. Alternatively, a plurality of shallow holes may be drilled in a suitable pattern to receive the various pins. When thus positioned, the earth anchoring structure is rigid along the central axis or line 18.

A tube or barrel 25 is supported by cross arms 26 between the arms 14 and 15. The axis of barrel 25 coincides with the central axial line 18. As may be seen from Fig. 2 and Fig. 3, the axis of barrel 25 preferably passes through the center of gravity of the earth anchoring member 10.

The central member 17 includes a pair of horizontal plates 17a and 17b with an end flange 17c at its right hand end and an end target plate 17d at its left hand end. As shown in Fig. 1 and in more detail in Fig. 3, a cylinder 30 is supported at and extends from the target plate 17d toward the tube 25. As shown in Fig. 3, cylinder 30 is served or threaded onto the stud 31 which is fastened to and extends through the target plate 17d. The cylinder 30 is positioned coaxially with respect to the tube 25.

Further, and as shown in Fig. 3, a cylindrical mass 35 shown on the left at the breach end of the tube 25 is slideably mounted for travel along the tube to impinge or strike the cylinder 30 attached to the earth anchoring member 10. The cylinder 30 positioned immediately adjacent the muzzle end of the tube 25 and supported from the target plate 17d is preferably yieldable or deformable as to stop the mass 35 in a preselected time interval. By this means energy imparted to the earth through the earth anchoring member 10 may be given a predetermined frequency characteristic. More specifically, with a mass of one thousand pounds (1,000#) traveling at a velocity of 75 miles per hour, a cylinder twelve inches (12") long and three inches (3") in diameter of annealed aluminum will stop the mass while undergoing a four inch (4") deformation. The period during which cylinder 30 undergoes deformation under such conditions is 1/165 of a second which corresponds to one-fourth the period of waves of a frequency of approximately 40 cycles per second. If the velocity is lower, the band of frequencies imparted to the earth will be correspondingly lower. Alternatively, the frequency of the energy imparted to the earth may be varied by maintaining the weight velocity constant but by varying the character of the yieldable member 30. At 75 miles per hour and an eight inch (8") deformation, the frequency of the wave imparted would be predominantly at approximately 20 cycles per second. Thus by properly decelerating mass 35, energy of preselected characteristics may be transmitted as shear waves to the earth's surface.

In Fig. 4 the yieldable member 30 is shown mounted on the target plate 17d, being viewed in this figure through the barrel 25. As indicated, the earth at the barrel location preferably is trenched to permit the arms of the frame 10 to rest on or flush with the earth's surface.

In Fig. 5 a portion of the target is shown to illustrate the position of the stud 31 mounted in the target plate 17d.

Referring now to Fig. 6, there is illustrated in detail one form of mechanism for restraining and releasing the mass 35 for travel through the barrel 25. Mass 35 is provided with a pair of rings only one of which, the ring 35a, is shown in Fig. 6. The rings support the mass 35 in the barrel and serve to reduce the contact area between mass 35 and barrel 25 to keep friction at a minimum.

Barrel 25 is provided with closure means including end plates 40 secured to the breech end as by bolts 41 extending through a flange 42. The end plates 40 have an aperture at the center thereof preferably coaxial with the axis of the barrel 25 and, as here shown, of approximately one-half the diameter of the barrel 25. An S-shaped tube or channel 45 extends into the aperture in the plates 40. Channel 45 is preferably secured at one end to the plates 40 as by welding and at the other end is connected by a flanged coupling 46 to a resilient high pressure hose section 47 which in turn is connected by flange coupling 48 to a gate valve 49. Valve 49 in turn is connected through coupling 50 to a suitable source of high pressure expansible gas (not shown) to be connected to the conduit of pipe 51. The high pressure source may be a larger air chamber having a volume substantially greater than the entire volume of the tube 25 and supplied preferably by a high capacity compressing unit. For the purpose of the present description, it will be assumed that a pressure of 200 pounds per square inch is available at valve 49 with little diminution in pressure in propelling mass 35 through barrel 25.

In order to give mass 35 the highest velocity possible for a given pressure at valve 49, it is desirable to interconnect barrel 25 and the pressure source by way of a substantially unimpeded flow path. While the valve 49, preferably a gate valve, may provide this type of channel, the valve may not be opened rapidly enough to permit full and most efficient utilization of the energy from the pressure source. Accordingly, applicants provide means for releasably anchoring the mass 35, the anchor being of sufficient strength to withstand application of the maximum available air pressure to the mass 35 to permit the gate valve 49 to be fully opened before the mass 35 begins movement.

More particularly, a mandrel 60 extends from the left end of the mass 35, as viewed in Fig. 6, through the opening in plates 40 and into the channel 45. A cylindrical extension 61 is welded to the underside of channel 45 at the knee 45a. An opening is provided through the knee portion 45a coaxial with respect to barrel 25. The bore or channel through extension 61 is aligned with such opening.

The mandrel extending through the channel in the cylindrical extension 61 is threaded at its free end 63 to receive a nut 64. A washer 65 is secured by nut 64 against the shoulder 66 of the mandrel 60. A second washer 67 of cutting steel or otherwise presenting a high quality cutting edge is fitted in a re-entrant opening in the left hand end of the cylindrical extension 61 and bears against shoulder 68. By engaging shear washer 65, the cutting washer 67 restrains mass 35 at the breech end of the barrel 25.

The shear washer 65 is of material and dimensions selected to withstand the force exerted on the end of the mass 35 when gate valve 49 is open. In order to reduce substantially the stresses thus applied to the S-shaped channel 45 and the cylindrical extension 61, a rubber gasket 70 carried by the plate member 40, being secured thereto between rings 71 and 72 as by screws or bolts (not shown), forms an air seal with the beveled edge 73 of a part of the mandrel 60 when the nut 64 is served tightly onto the threaded end portion 63 of the mandrel. Thus the air pressure (above assumed to be 200 pounds per square inch) is effective only upon a fraction of the area of the piston or weight 35. The valve 49 may then be opened completely to provide an unobstructed flow path for air from the source through the channel 51, 47 and 45 to the barrel 25 before the cylindrical mass 35 is permitted to move.

In order to release weight 35 for travel through barrel 25 under the maximum pressure available, there is provided a push pin 80 supported by a cap member 81 which threadedly engages the end of the cylindrical extension 61. An eccentric or cam surface 83 for actuating push pin 80 is formed with a handle member 84. The cam 83 is pivotally mounted on a pin 85 which threadedly engages a supporting structure 86 secured to the underside of the channel member 45. Upon rotation of the cam surface 83, the push pin 80 is moved against the nut 64 so that the cutting edge of washer 67 shears the washer 65 and thus releases the mass 35. Upon initial movement of the mass 35, the air seal between the beveled surface 73 and the washer 70 is broken, abruptly applying the air pressure in channel 45 to the entire end area of the mass 35 to produce maximum acceleration through tube 25.

The mass, after traveling along the barrel, is stopped at the muzzle end without leaving the barrel as above discussed. After stopping the mass 35 at target 10, gate valve 49 may be closed and steps taken to bleed the tube 25 and flow channel 45. To this end, cap 81 may be removed or a suitable bleeder valve may be provided. Thereafter the weight 35 will be driven to the breech end of the tube 25, nut 64 and the shear washer 65 removed, a new washer fitted to the mandrel 60 and the nut 64 replaced. Cap 81 is then replaced and the system is again ready for release of mass 35.

By way of example, a suitable system may have the following parameters. With a tube one foot (1') in diameter and fifteen feet (15') long, a flow channel 45, 47 and 51 six inches (6") in diameter connected to an air tank three feet (3') in diameter and seven feet (7') long, a one thousand pound (1,000#) weight will attain a muzzle velocity of approximately 75 miles per hour. By utilizing an aluminum cylinder of the type above described (three inches diameter, twelve inches long), stresses in the ground anchoring member may be maintained within practical limits so that the ground anchoring structure may be sufficiently light as not to distort the character of the energy transmitted to the earth. By decelerating the mass over a selected interval, the high energy confined to a limited frequency band may be imparted to the earth.

As explained in the aforementioned co-pending White et al. application, detectors sensitive to horizontally polarized waves the positioned as to be sensitive to particle motion parallel to the direction of travel of mass 35 and may be utilized to generate electrical signals in the production of seismic shear wave records. The detectors may be positioned either at spaced points along a line perpendicular to the direction of travel of mass 35 or on a line parallel to or coincident with an extension of the axis of barrel 25 so long as they are oriented as to be sensitive to motion in the direction of travel of the mass.

In Fig. 7 there is illustrated an alternative form of means for decelerating the mass 35. Immediately adjacent the end of the tube 25 there is provided a secondary cylinder 90 having a piston 91. The cylinder 90 is rigidly supported from the ground anchoring member generically represented by the cross-hatched section 92. The interior of the cylinder 90 is charged to relatively high pressure from a suitable source, for example a tank 93. Initial pressures of the order of 10,000 pounds per square inch may be used. Upon opening valve 94 of tank 93 the piston 91 is maintained against the keeper flanges of the cylinder 90. When the mass 35 is driven against piston 91, the high pressure gas in cylinder 90 cushions the mass 35 bringing the mass to a halt in a period depending upon its mass and velocity and upon the dimensions of the cylinder 90 and the initial internal pressure. The deceleration characteristics may be modified by adding a leak valve 95 to vent the cylinder 90. Suitable venting may be desired to prevent undue recoil and resultant multiple pulsing of the two mass-pressure systems, if oscillation takes place following first contact of the piston 91 with mass 35.

The foregoing systems are given by way of example only and are not intended to be limiting upon the present invention. Other decelerating means may be found suitable as well as other specific restraining and releasing means for the weight 35. However, it will be recognized that by applying pressure from a large volume source to the cylindrical mass slideably mounted in the barrel, high energies may be imparted through the earth as shear waves through the anchoring structure. The frequency content of such energy may be controlled by means of suitably designed catching devices.

The foregoing discussion has considered a system in which an expansible gas, such as air under high pressure, is utilized to drive the cylindrical mass 35. In Fig. 8 an alternative system is shown in which an explosive charge is utilized. Where consistent, the parts have been given the same reference characters as the preceding figures.

In this system the mass 35, only a portion of which is shown along with a portion of barrel 25, is positioned near the breech end and closely adjacent an explosive charge 100. A closure member 101 of relatively large diameter threadedly engages the breech end of the barrel 25. A detonator 102, for example an electric blasting cap, is connected through insulated terminals 103 to a battery 104. A switch 105, upon closure, completes the circuit from battery 104 to the cap or detonator 102 to initiate detonation of the charge 100.

In the form illustrated, a restraining member such as rod 106, threadedly engaging the end of the mass 35, restrains mass 35 until the pressure produced upon detonation of charge 100 reaches a predetermined maximum. The rod 106 is suitably machined to provide a neck 107 whose ultimate strength is so selected as to rupture when said predetermined initial pressure is built up on the end of mass 35. Although satisfactory operation under certain conditions may be obtained without restraining means such as rod 107, its use permits most efficient utilization of the barrel 25 for a given pressure source. The detonation of the charge 100 produces an expansible gas pressure for acceleration of the mass. Preferably the explosive is selected to have a low detonation velocity so that a substantially constant pressure may be maintained upon the end of mass 35.

While not shown in Fig. 8, the mass catching or decelerating devices previously described will be utilized in connection with this explosive propelled system to transfer the energy from the moving mass to the earth in the form of shear waves.

While certain preferred embodiments of the present invention have been illustrated and described, it is to be understood that further modifications may now suggest themselves to those skilled in the art, and it is intended to cover such modifications as fall within the scope of the appended claims.

What is claimed is:

1. In a seismic shear wave generator for producing high energy shear waves the combination which comprises an elongated barrel horizontally positioned on the earth's surface, closure means at a first end of said barrel having an aperture therethrough, a high pressure expansible gas source, a substantially unobstructed flow path interconnecting said source and said aperture deviating abruptly from the axis of said barrel adjacent said first end, a link fastened to the end of said cylindrical mass and extending through said aperture and coupled to the wall of said flow path substantially at the point of deviation thereof from said axis, means for breaking said link to release said mass for producing high velocity travel of said mass under said high pressure along the length of said barrel, and means coupled to the earth's surface for abruptly arresting travel of said mass at the other end of said barrel.

2. In a seismic shear wave generator for producing high energy shear waves the combination which comprises a source of expansible gas under high pressure, an elongated barrel of substantial diameter positioned on the earth's surface, a cylindrical mass slideably mounted within said barrel, a closure member at a first end of said barrel having a central aperture of substantially smaller diameter than said barrel, a substantially unobstructed flow path interconnecting said source and said aperture deviating abruptly from the axis of said barrel adjacent said first end, a mandrel secured to the end of said cylindrical mass and extending through said aperture and through the wall of said flow path at the point of deviation thereof from said axis, means for rigidly fastening said mandrel to said wall for maintaining said cylindrical mass against said breech end to close said aperture to form a substantially air tight seal for limiting initial application of said pressure to the area of the end of said mass equal to the area of said aperture, means for releasing said mandrel for application to said mass upon initial movement thereof of the pressure from said source to the entire end area of said cylindrical mass for producing high velocity travel along the length of said barrel, and means rigidly coupled to the earth's surface for abruptly arresting travel of said mass at the other end of said barrel.

3. A system for generating horizontally polarized shear waves of high intensity and predominantly of a preselected seismic frequency which comprises an elongated tube positioned parallel to and substantially at the earth's surface, a cylindrical mass slideably mounted in said tube and anchored at one end of said tube, a source of high pressure expansible gas having a volume substantially greater than the entire volume of said tube, means forming an unimpeded flow path interconnecting said source and said one end of said tube, means for releasing said anchored mass for travel under said pressure along the length of said tube, a framework spaced from said tube including a plurality of ground anchoring pins distributed throughout a substantial area of the earth's surface and rigid in the direction of the axis of said tube and having a target immediately adjacent the other end of said tube for receiving said mass at the point in its travel of highest velocity, and a yieldable member supported from said framework in the travel path of said mass and in front of said target for stopping said mass in an interval substantially equal to one-fourth the period of said frequency.

4. A seismic shear wave generator for producing high energy seismic shear waves which comprises an elongated barrel horizontally positioned on the earth's surface, closure means for a first end of said barrel, a cylindrical mass mounted within said barrel adjacent said closure means, a high pressure expansible gas source, means for abruptly applying pressure from said source to the entire area of the end of said mass adjacent said closure means to produce high velocity travel of said mass along the length of said barrel, a framework spaced from said barrel including a plurality of ground anchoring pins distributed throughout a substantial area of the earth's surface and interconnected as to be rigid in the direction of the axis of said barrel and having a target immediately adjacent the other end of said barrel, and yieldable means supported by said framework in the travel path of said means for abruptly arresting travel of said mass at said other end of said barrel.

5. A system for generating horizontally polarized shear waves of high intensity and predominantly of a preselected seismic frequency which comprises an elongated tube positioned parallel to and substantially at the earth's surface, a cylindrical mass slideably mounted in said tube and anchored at one end of said tube, a source of high pressure expansible gas having a volume substantially greater than the entire volume of said tube, means forming an unimpeded flow path interconnecting said source and said one end of said tube, means for releasing said anchored mass for travel under said pressure along the length of said tube, a framework spaced from said tube including a plurality of ground anchoring pins distributed throughout a substantial area of the earth's surface and rigid in the direction of the axis of said tube and having a target immediately adjacent the other end of said tube for receiving said mass at the point in its travel of highest velocity for abruptly arresting travel of said mass and to impart the energy thereof to the earth.

References Cited in the file of this patent
UNITED STATES PATENTS

| | | |
|---|---|---|
| 421,307 | Reynolds | Feb. 11, 1890 |
| 1,405,664 | Boileau | Feb. 7, 1922 |
| 1,917,066 | Schalseha | July 4, 1933 |
| 2,050,047 | Febrey | Aug. 4, 1936 |
| 2,072,224 | Seidl | Mar. 2, 1937 |
| 2,096,002 | Moreira et al. | Oct. 19, 1937 |
| 2,203,140 | Green | June 4, 1940 |
| 2,537,096 | Shreeve et al. | Jan. 9, 1951 |
| 2,599,989 | Haston | June 10, 1952 |